US011298922B2

(12) United States Patent
Gilbert

(10) Patent No.: US 11,298,922 B2
(45) Date of Patent: Apr. 12, 2022

(54) PACKAGING LAMINATE

(71) Applicant: BMSI, Inc., Monroe, GA (US)

(72) Inventor: Lee Phillips Gilbert, Athens, GA (US)

(73) Assignee: BMSI, Inc., Monroe, GA (US)

( * ) Notice: Subject to any disclaimer, the term of this patent is extended or adjusted under 35 U.S.C. 154(b) by 167 days.

(21) Appl. No.: 16/106,230

(22) Filed: Aug. 21, 2018

(65) Prior Publication Data
US 2018/0354241 A1    Dec. 13, 2018

Related U.S. Application Data

(63) Continuation-in-part of application No. 15/442,098, filed on Feb. 24, 2017.
(Continued)

(51) Int. Cl.
*B32B 27/08* (2006.01)
*B32B 27/20* (2006.01)
(Continued)

(52) U.S. Cl.
CPC ............ *B32B 27/08* (2013.01); *B32B 27/205* (2013.01); *B32B 27/306* (2013.01);
(Continued)

(58) Field of Classification Search
CPC ....... B32B 27/08; B32B 27/18; B32B 27/205; B32B 27/306; B32B 27/308; B32B 27/32; B32B 27/327; B32B 2250/02; B32B 2250/03; B32B 2250/242; B32B 2250/246; B32B 2270/00; B32B 2307/514;
(Continued)

(56) References Cited

U.S. PATENT DOCUMENTS 3,333,024 A    7/1967  Haefele et al. ............... 260/880
5,084,352 A *  1/1992  Percec ................... B32B 27/08
                                                   428/412
(Continued)

FOREIGN PATENT DOCUMENTS

CN    204801185      11/2015
EP    1 323 520 A2    7/2003
(Continued)

OTHER PUBLICATIONS

Saimos et al. Compatibilization of poly(ethylene-co-vinyl alcohol) (EVOH) and EVOH/HDPE blends with ionomers. Structure and Properties. Polymer vol. 39 No. 16 pp. 3863-3870 1998 (Year: 1998).*
(Continued)

*Primary Examiner* — Frank J Vineis
*Assistant Examiner* — Laura B Figg
(74) *Attorney, Agent, or Firm* — Bradley Arant Boult Cummings LLP

(57) ABSTRACT

Disclosed herein are compositions and methods related to a packaging laminate comprising: a first polymeric layer comprising a polypropylene copolymer or a high density polyethylene (HDPE) resin; and a second polymeric layer comprising a high density polyethylene (HDPE) resin or linear low density polyethylene (LLDPE) resin with a coextruded ethyl vinyl alcohol (EVOH) compatibilizer. Also disclosed herein are packaging containers formed of the packaging laminates.

19 Claims, 7 Drawing Sheets

Related U.S. Application Data

(60) Provisional application No. 62/299,235, filed on Feb. 24, 2016, provisional application No. 62/322,886, filed on Apr. 15, 2016.

(51) Int. Cl.
*B32B 27/30* (2006.01)
*B32B 27/32* (2006.01)

(52) U.S. Cl.
CPC .......... *B32B 27/308* (2013.01); *B32B 27/327* (2013.01); *B32B 2250/03* (2013.01); *B32B 2270/00* (2013.01); *B32B 2307/514* (2013.01); *B32B 2307/54* (2013.01); *B32B 2307/5825* (2013.01); *B32B 2307/7244* (2013.01); *B32B 2307/7246* (2013.01); *B32B 2307/732* (2013.01); *B32B 2439/70* (2013.01)

(58) Field of Classification Search
CPC ........ B32B 2307/54; B32B 2307/5825; B32B 2307/7244; B32B 2307/7246; B32B 2307/732; B32B 2439/70
See application file for complete search history.

(56) References Cited

U.S. PATENT DOCUMENTS

| | | | |
|---|---|---|---|
| 5,352,744 A | 10/1994 | Bates et al. | 525/339 |
| 5,612,422 A | 3/1997 | Hucul et al. | 525/338 |
| 5,645,253 A | 7/1997 | Hoshino | 248/181.1 |
| 2004/0166298 A1 | 8/2004 | Chapman et al. | 428/212 |
| 2004/0206055 A1* | 10/2004 | Schroeder | B65B 9/093 53/512 |
| 2008/0178768 A1* | 7/2008 | Breese | B32B 27/32 106/285 |
| 2008/0310770 A1* | 12/2008 | Turvey | B65D 81/2015 383/42 |
| 2009/0052813 A1 | 2/2009 | Grosse-Heitmeyer et al. | 383/101 |
| 2011/0091695 A1* | 4/2011 | Bevilacqua | B32B 27/36 428/195.1 |

FOREIGN PATENT DOCUMENTS

| | | | | |
|---|---|---|---|---|
| EP | 2 123 452 A1 | 11/2009 | | |
| KR | 100521594 | 10/2005 | | |
| MX | 9801669 | 6/1998 | | |
| WO | WO-2014088827 A1 * | 6/2014 | | C08L 23/0815 |

OTHER PUBLICATIONS

"Enhancing the Value of Barrier Film Recycle Streams with Dow's Compatibilizer Technology" (Year: 2014).*

* cited by examiner

PACKAGING LAMINATE

This application is a continuation-in-part of U.S. application Ser. No. 15/442,098, filed on Feb. 24, 2017, which claims the benefit of U.S. Provisional Application No. 62/299,235, filed on Feb. 24, 2016, and U.S. Provisional Application No. 62/322,886, filed on Apr. 15, 2.016, the applications of which are incorporated herein by reference in their entirety.

FIELD OF THE INVENTION

This invention relates to food packaging materials and more particularly to a recyclable flexible packaging laminate.

BACKGROUND OF THE INVENTION

Coffee and other food products are packaged in bags formed from plastic wrap. Such plastic wrap must meet certain USDA and FDA standards. In addition, in order to protect food products from contamination and extend the shelf life of the food products, the plastic wrap must be durable, printable, and capable of running on packaging machines. Finally, the plastic wrap should be recyclable once it has been discarded. None of the conventional films used in the market today are recyclable or designed to extend the shelf life of food products.

Accordingly, a need exists for a plastic wrap material that meets all the criteria outlined above.

SUMMARY OF THE INVENTION

In one aspect, disclosed herein are packaging laminates comprising a first polymeric layer comprising a polypropylene copolymer; and a second polymeric layer comprising a low density polyethylene (LDPE), linear low density polyethylene (LLDPE), and/or high density polyethylene (HDPE) resin with a coextruded ethyl vinyl alcohol (EVOH) compatibilizer.

Disclosed herein are packaging laminates of any proceeding aspect, further comprising a third polymeric layer positioned between the first layer and the second layer, wherein the third polymeric layer comprises an HDPE resin.

In one aspect disclosed herein are packaging laminates comprising a first polymeric layer comprising a high density polyethylene (HDPE) resin; and a second polymeric layer comprising a low density polyethylene (LDPE), linear low density polyethylene (LLDPE), and/or high density polyethylene (HDPE) resin with a coextruded ethyl vinyl alcohol (EVOH) film barrier.

Also disclosed are packing laminates of any proceeding aspect, further comprising a third layer positioned between the first layer and the second layer, wherein the third polymeric layer comprises an HDPE resin.

In another aspect, the present invention is directed to a packaging container, including a container body formed of a packaging laminate, wherein the packaging laminate includes: a first layer, constituting an outer layer of the packaging laminate, including a high density polyethylene (HDPE) resin and a second layer, constituting an, inner layer of the packaging laminate, comprising a linear low density polyethylene (LLDPE) resin with a coextruded ethyl vinyl alcohol (EVOH) film barrier. In one embodiment, the HDPE includes 80 percent by weight of the first layer. In another embodiment, the first layer further includes octene in an amount of 20 percent by weight of the first layer. In still another embodiment, the first layer further includes a calcium carbonate filler. The first layer of the packaging laminate may have a thickness of about 0.008 MIL to about 2 MIL. The second layer of the packaging laminate may have a thickness of about 2 MIL to about 5 MIL.

In still another aspect, the present invention is directed to a packaging container, including a container body formed of a packaging laminate, wherein the packaging laminate includes a print layer, constituting an outer layer of the packaging laminate, including a high density polyethylene (HDPE) resin, a core layer, constituting an intermediate layer of the packaging laminate, including a HDPE resin, a linear low density polyethylene (LLDPE) resin, a low density polyethylene (LDPE) resin, or combinations thereof, and a sealant layer, constituting an inner layer of the packaging laminate, comprising a LLDPE resin with a coextruded ethyl vinyl alcohol (EVOH) barrier, and a degassing valve formed in a wall of the container body. In one embodiment, the degassing valve is removably attached to the wall of the container body. In another embodiment, the print layer has a thickness of about 0.008 MIL to about 2 MIL. In still another embodiment, the print layer may have a first side and a second side, wherein the second side is adjacent to the core layer, and wherein the second side is capable of being printed thereon. In yet another embodiment, the HDPE includes at least 40 percent by weight of the print layer.

In this aspect, each layer of the packaging laminate has a haze value of about 10 percent to about 60 percent. In another embodiment, the packaging container may have a percentage of residual oxygen of about 2.65 percent or less over a time period of 52 weeks. In still another embodiment, the sealant layer further includes a HDPE resin or a LDPE resin. The sealant layer may also further include from about 8 percent to about 20 percent weight of an ionomer.

In yet another aspect, the present invention is directed to a method of recycling the packaging container disclosed above by extruding the packaging container to form an extruded plastic; pelletizing the extruded plastic; and combining the extruded plastic with an amount of linear low-density polyethylene (LLDPE). In this embodiment, the amount of LLDPE is about 25 percent by weight to about 75 percent by weight.

The foregoing and other features and advantages of the invention will be apparent to those of ordinary skill in the art from the following more particular description of the invention and the accompanying drawing.

DETAILED DESCRIPTION OF EMBODIMENTS OF THE INVENTION

Figure 1:
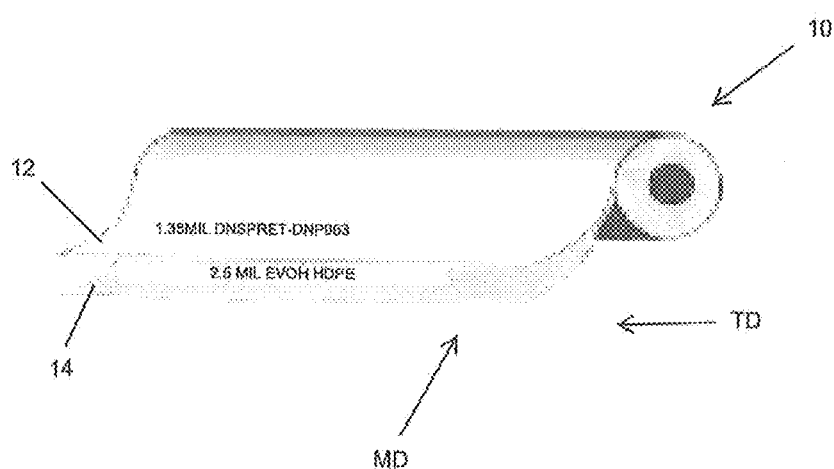
FIG. 1 is a perspective drawing of a first embodiment of a packaging laminate in accordance with the present invention.

The present invention is a packaging laminate that meets the criteria for plastic wrap for food products. In one aspect, the packaging laminate comprises two or more layers of a polyolefin film. It is understood and herein contemplated that the polymeric layers comprise, amongst other things one or more polymeric resins. Resins suitable for the present invention are polyolefins which may include low density polyethylene (LDPE), linear low density polyethylene (LLDPE), high density polyethylene (HDPE), medium density polyethylene (MDPE), low density polyethylene/high density polyethylene (LD/HDPE) mixes, ultra high molecular weight polyethylene (UHMWPE), cross-linked polyethylene (XLPE), polypropylene (PP) polymers, metallocene catalyzed polyolefin plastomer) resins. The resins of the present invention may either be homopolymers, co-polymers and/or ter-polymers of any one or more of the above polymers. Examples of the latter are olefin-copolymers such as polyethylene butylacrylate, polyethylene methacrylate, polypropylene-ethylene copolymers, and polyethylene vinyl acetate, and ter polymers of polypropylene-ethylene co-polymer, LDPE, and HDPE.

Because the disclosed film comprises multiple polymeric layers, it is understood, that that the polymeric composition of each layer can contribute to the physical attributes of the film given the intended use of the film. Accordingly, the composition of each layer of the multilayered polymeric film can be different or the same as any one or more additional layers. In one aspect, each layer of the multilayered polymeric film can comprise different polyolefin resins. For example, the first polymeric layer can comprise one or more polypropylene, polypropylene co-polymers, polyethylene, LDPE, MDPE, HDPE, and/or LDPE/HDPE co-polymer resins or calcium carbonate and the second polymeric layer can comprise one or more HDPE, LLDPE, LDPE and/or LD/HDPE copolymer resins. Accordingly, in one aspect, disclosed herein are packaging laminates comprising a first polymeric layer comprising a polypropylene copolymer (such as, for example a polypropylene-ethylene or polypropylene-ethylene), LDPE, MDPE, HDPE and/or LD/HDPE co-polymers; and a second polymeric layer comprising a high density polyethylene (HDPE), linear low density polyethylene, (LLDPE), or low density (LDPE), and/or LD/HDPE co-polymer resin. Also disclosed are packaging laminates comprising a first polymeric layer comprising a high density polyethylene (HDPE) resin; and a second polymeric layer comprising a high density polyethylene (HDPE), linear low density polyethylene (LLDPE), or tow density (LDPE), and/or LD/HDPE co-polymer resin. Furthermore, disclosed are packaging laminates comprising a first polymeric layer comprising a medium density polyethylene (MDPE) resin; and a second polymeric layer comprising a high density polyethylene (HDPE), linear low density polyethylene (LLDPE), or low density (LDPE), and/or LD/HDPE co-polymer resin. The resins employed in the disclosed packaging laminates can be virgin resins or from reclaimed or recycled sources.

It is understood and herein contemplated that there can be more than one component or polymer in the first and second polymeric layers. In one aspect, the polymer comprising the greatest percentage weight of the polymeric layer (i.e., the primary polymer) can be at least 1, 2, 3, 4, 5, 6, 7, 8, 9, 10, 15, 16, 16.8, 17, 20, 25, 30, 33, 35, 40, 45, 50, 55, 58.3, 60, 65, 66, 66.6, 70, 75, 80, 85, 90, 91, 92, 93, 94, 95, 96, 97, 98, 99, or 100 percentage weight (or any amount in between) of the first and/or second polymeric layer. For example, disclosed herein are packaging laminates wherein the first polymeric layer comprises a polypropylene co-polymer (for example, a polypropylene-ethylene co-polymer), wherein the polypropylene copolymer comprises between 35% and 55% weight, more preferably between 40% and 50% weight, and more preferably 45% weight of the first polymeric layer. In another embodiment, for example, the first polymeric layer comprises HDPE, wherein the HDPE comprises between 40% and 100% weight (i.e., 40, 45, 50, 55, 60, 65, 70, 75, 80, 85, 90, 91, 92, 93, 94, 95, 96, 97, 98, 99, or 100% weight), more preferably between 60% and 100% weight, most preferably between 75% and 100% weight of the first polymeric layer. In one aspect, the HDPE can be 80% weight of the first polymeric layer (for example a first polymeric layer comprising 80% weight HDPE and 20% weight Octene). In another embodiment, the HDPE may be present in the first polymeric layer with other polypropylene resins, such as LDPE and/or MDPE. In this aspect, the HDPE may be present in the first polymeric layer in an amount of at least 40% by weight. In another embodiment, the HDPE is present in the first polymeric layer in an amount of at least 50% by weight. In still another embodiment, the HDPE is present in the first polymeric layer in an amount of at least 60% by weight.

Also, by way of example, disclosed herein are packaging laminates wherein the second polymeric layer comprises HDPE at 66.6% weight of the second polymeric layer. In a further embodiment, disclosed herein are packaging laminates wherein the second polymeric layer comprises HDPE at 58.3% weight of the second polymeric layer. Thus, for example disclosed herein are packaging laminates comprising a polypropylene co-polymer first polymeric layer and a second polymeric layer comprising HDPE at between 50 and 70% weight (such as, for example 58.3% or 66.6%) of the second polymeric layer. Also, disclosed herein are, for example, packaging laminates comprising a HDPE first polymeric layer and a second polymeric layer comprising HDPE at between 50 and 70% weight (such as, for example 58.3% or 66.6%) of the second polymeric layer.

As noted above, the disclosed polymeric layers can comprise additional secondary components including polymers in addition to the primary polymer, including, but not limited to additionally one or more of octene, LLDPE, LDPE, MDPE, HDPE, LD/HDPE polymers, catalysts (for example, metallocene), antiblock components, plastomers, ionomers (such as, for example SURLYN®), tie, slip components, ethyl vinyl alcohol (EVOH), and EVOH compatibilizers (such as, for example Dow RETAIN® EVOH Compatibilizer). Accordingly, in one aspect, disclosed herein are packaging laminates wherein the first polymeric layer further comprises octene, LLDPE, LDPE, MDPE, HDPE, and/or LD/HDPE co-polymer resins. It is understood and herein contemplated that the secondary components can each individually comprise any percentage weight less than the primary polymer including, but not limited to 0.2, 0.22, 0.3, 0.4, 0.5, 0.55, 0.6, 0.7, 0.8, 0.9, 1, 1.1, 1.2, 1.3, 1.4, 1.5, 1.6, 1.7, 1.8, 1.9, 2, 3, 4, 5, 5.9, 6, 6.5, 7, 8, 9, 10, 10.23, 11, 11.8, 12, 12.2, 13, 14, 15, 16, 16.8, 17, 18, 19, 20, 25, 30, 30.2, 33, 35, 40, 45 percent weight. In one aspect, the first polymeric layer can comprise a HDPE resin of 16.8 percent weight and a LDPE resin of 6 percent weight of the total weight of the first polymeric layer (for example, a first polymeric layer comprising a polypropylene co-polymer (such as 45% polypropylene co-polymer) and 16.8% weight HDPE and 6% weight LDPE). In another embodiment, the first polymeric layer can comprise 80% weight HDPE and 20% weight octene. Also contemplated herein are polymeric layers comprising between 8% and 20% weight, more preferably between 10% and 14% weight, most preferably between 12% and 13% plastomer (for example a polymeric layer (such as a second polymeric layer comprising 12.2% weight plastomer)). Also contemplated herein are polymeric layers comprising between 8% and 20% weight, more preferably between 10% and 14% weight, most preferably between 10% and 12% ionomer such as SURLYN® (for example a polymeric layer (such as a second polymeric layer comprising 10.23% weight ionomer).

As previously noted, the polymeric layers can comprise additives such as antioxidants (for example, hindered phenols such as, for example, IRGANOX® 1010), phosphites (for example, IRGAFOS® 168)), U. V. stabilizers, cling additives (for example, polyisobutylene), antiblock additives, slip agents, colorants, pigments, fillers such as calcium carbonate, fire retardants, light and heat stabilizers, and extension oils can also be included in the compositions of the present invention, to the extent that they do not interfere with the enhanced properties discovered by applicants. In-process additives, for example, calcium stearate, water, and fluoropolymers may also be used for purposes such as for the deactivation of residual catalyst or for further improved processability.

Optionally, compatibilizers such as a low molecular weight plastomer may also be used in the composition of the present invention. A compatibilizer typically contains a functional group which is compatible with the primary polymer of the second polymeric layer such as, for example, HDPE. Compatibilizers are well-known in the art and one skilled in the art would easily be able to recognize the type of compatibilizer suitable for the desired compositions, if needed. For example, a blend of a hydrogenated rigid block copolymer with a styrene-butadiene-styrene block copolymer or other styrenic polymer may additionally comprise a styrene-ethylenebutene-styrene block copolymer as a compatibilizer. Additionally, a blend of a hydrogenated rigid block copolymer with a polycarbonate may additionally comprise a polyamide-maleic anhydride grafted polyethylene as a compatibilizer. In one aspect, the compatibilizer can be an ethyl vinyl alcohol (EVOH) compatibilizer, such as, for example Dow RETAIN® EVOH Compatibilizer. Thus, in one aspect, disclosed herein are packaging laminates comprising a first polymeric layer comprising a polypropylene copolymer; and a second polymeric layer comprising a Low Density Polyethylene (LDPE), Linear low density polyethylene (LLDPE), and/or high density polyethylene (HDPE) resin with a coextruded ethyl vinyl alcohol (EVOH) compatibilizer. In another aspect, disclosed herein are packaging laminates including a first polymeric layer including a HDPE resin and a second polymeric layer including a Low Density Polyethylene (LDPE), Linear low density polyethylene (LLDPE), and/or high density polyethylene (HDPE) resin with a coextruded ethyl vinyl alcohol (EVOH) compatibilizer. It is contemplated herein that the compatibilizer can comprise between 2 and 15 percentage weight of the polymeric layer (for example 2, 3, 4, 5, 6, 7, 8, 9, 10, 11, 12, 13, 14, or 15 percent weight), more preferably between 5 and 10 percent weight. Accordingly, disclosed herein are packaging laminates wherein the second polymeric layer comprises a compatibilizer (such as, for example, Dow RETAIN® EVOH compatibilizer), and wherein the compatibilizer comprises at least about 5% weight of the second polymeric layer.

In one aspect, the compatibilizer is loaded in a 1:1 ratio with a barrier such as, for example, an EVOH barrier. In one aspect, disclosed herein are packaging laminates comprising packaging laminates comprising a first polymeric layer comprising a polypropylene copolymer; and a second polymeric layer comprising a Low Density Polyethylene (LDPE), Linear low density polyethylene (LLDPE), and/or high density polyethylene (HDPE) resin with a coextruded ethyl vinyl alcohol (EVOH) compatibilizer and an EVOH barrier. Also disclosed herein are packaging laminates comprising a first polymeric layer comprising a high density polyethylene (HDPE) film; and a second polymeric layer comprising Low Density Polyethylene (LDPE), Linear low density polyethylene (LLDPE), and/or high density polyethylene (HDPE) resin (for example, a low density/high density polyethylene (LD/HDPE) film) with a coextruded ethyl vinyl alcohol (EVOH) film barrier. In another aspect, disclosed herein are packaging laminates comprising a first polymeric layer comprising a medium density polyethylene (MDPE) film; and a second polymeric layer comprising Low Density Polyethylene (LDPE), Linear low density polyethylene (LLDPE), and/or high density polyethylene (HDPE) resin (for example, a low density/high density polyethylene (LD/HDPE) film) with a coextruded ethyl vinyl alcohol (EVOH) film barrier. Accordingly, disclosed herein are packaging laminates comprising between 2 and 15 percentage weight of the polymeric layer (for example 2, 3, 4, 5, 6, 7, 8, 9, 10, 11, 12, 13, 14, or 15 percent weight), more preferably between 5 and 10 percent weight. For example, in one aspect, the packaging laminates can comprise a compatibilizer (such as, for example, Dow RETAIN® EVOH Compatibilizer) and a barrier (for example, an EVOH barrier) wherein the compatibilizer and the barrier are each 5% total weight of the second polymeric layer.

In one aspect, the disclosed polymeric layers of the packaging laminates can comprise a catalyst (such as, for example Metallocene). Typically, copolymers are hydrogenated to remove sites of unsaturation. Any method of hydrogenation can be used and such methods typically include the use of metal catalysts supported on an inorganic substrate, such as Pd on BaSO4 (U.S. Pat. No. 5,352,744) and Ni on kieseiguhr (U.S. Pat. No. 3,333,024), Additionally, soluble, homogeneous catalysts such as single-site catalyst systems known in the art such Ziegler vanadium, hafnium and zirconium catalyst systems and metallocene catalyst systems for example, a constrained geometry catalyst systems or those prepared from combinations of transition metal salts of 2-ethylhexanoic acid and alkyl lithiums can be used. The copolymer hydrogenation can also be achieved using hydrogen and a heterogeneous catalyst such as those described in U.S. Pat. Nos. 5,352,744, 5,612,422 and 5,645,253. The catalysts described therein are heterogeneous catalysts consisting of a metal crystallite supported on a porous silica substrate.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of catalyst (such as, for example, Metallocene) can be between 0.2 and 40 percent weight of the polymeric layer of the packaging laminate, preferably between 5 and 33 percent weight. For example, the catalyst (such as, for example, Metallocene) can comprise 0.2, 0.3, 0.4, 0.5, 0.6, 0.7, 0.8, 0.9, 1, 2, 3, 4, 5, 5.9, 6, 7, 8, 9, 10, 11, 11.8, 12, 13, 14, 15, 16, 17, 18, 19, 20, 21, 22, 23, 24, 25, 26, 27, 28, 29, 30, 30.2, 31, 32, 33, 34, 35, 36, 37, 38, 39, or 40 percent weight of a polymeric layer. It is understood and herein contemplated that the percent weight of catalyst for each polymeric layer is independent of the other layer(s). For example, the catalyst (such as, for example Metallocene) can comprise 30.2 percent weight of the first polymeric layer and 5.9 percent weight of the second polymeric layer.

In one particular embodiment, the packaging laminate can comprise a first polymeric layer comprising a polypropylene co-polymer and a second polymeric layer comprising an HDPE, LDPE, and/or LLDPE resin co-extruded with an EVOH barrier and an EVOH compatibilizer (such as Dow RETAIN® EVOH compatibilizer) as set forth in Table 1 below.

TABLE 1

| Resin | % Total in DNSPRET-DNP963-T4 |
|---|---|
| Copolymer Polypropylene (3.8% Ethylene) | 45 |
| Metallocene | 30.2 |
| High Density Polyethylene | 16.8 |
| Low Density Polyethylene | 6 |
| Slip | 1.2 |
| Antiblock | 0.8 |
| | % Total in EVOH-ION-DOW |
| High Density Polyethylene | 58.3 |
| Plastomer | 122 |
| Tie | 6.5 |
| Metallocene | 11.8 |
| EVOH | 5 |
| Dow RETAIN ® EVOH Compatibilizer | 5 |
| Antiblock | 0.4 |
| Slip | 0.8 |

It is understood and herein contemplated that adjusting the percentage weight of individual components or changing components such as exchanging a plastomer for an ionomer) of either or both polymeric layers of the packaging laminate can change the packaging characteristics such as, for example, allowing for the ability to create a seam in a packaging container made of the packaging laminate at low heat or can be separated without tearing the polymeric layer. Additionally, such changes can change production speed, reduce pressure needed for recycling, reduce leaks, or increase puncture resistance. For example the use of an ionomer such as SURLYN® in the second polymeric layer allows for separation of a seam without tearing the packaging laminate. Thus, for example, in one aspect, the packaging laminate can comprise a first polymeric layer comprising a polypropylene co-polymer and a second polymeric layer comprising an HDPE, LDPE, and/or LLDPE resin co-extruded with an EVOH barrier and an EVOH compatibilizer (such as Dow RETAIN® EVOH compatibilizer) as set forth in Table 2 below.

TABLE 2

| Resin | % Total in DNSPRET-DNP963-T4 |
|---|---|
| Copolymer Polypropylene (3.8% Ethylene) | 45 |
| Metallocene | 30.2 |
| High Density Polyethylene | 16.8 |
| Low Density Polyethylene | 6 |
| Slip | 1.2 |
| Antiblock | 0.8 |
| | % Total in EVOH-ION-DOW |
| High Density Polyethylene | 66.6 |
| SURLYN ® | 10.23 |
| Tie | 6.5 |
| Metallocene | 5.9 |
| EVOH | 5 |
| Dow RETAIN ® EVOH Compatibilizer | 5 |
| Antiblock | 0.55 |
| Slip | 0.22 |

In another embodiment, the packaging laminate can include a first polymeric layer including HDPE and a second polymeric layer including a LLDPE resin co-extruded with an EVOH barrier and an EVOH compatibilizer (such as Dow RETAIN® EVOH compatibilizer).

It is understood and herein contemplated that there are structural and functional benefits to the orientation of the polymeric layers in the packaging laminate. For example, in one aspect, disclosed herein are packaging laminates comprising a first polymeric layer and a second polymeric layer, wherein the first polymeric layer is oriented to be on the outside layer of the packaging laminate. For example, in one embodiment, the packaging laminates comprise a first polymeric layer comprising a polypropylene co-polymer (such as a polypropylene and 3.5% ethylene co-polymer) and a second polymeric layer comprising HDPE, LLDPE, LDPE, and/or and LD/HDPE co-polymer. In another embodiment, the packaging laminates comprise a first polymeric layer comprising a polypropylene co-polymer (such as a polypropylene and 3.5% ethylene co-polymer) as well as LDPE and/or HDPE and a second polymeric layer comprising HDPE, LLDPE, LDPE, and/or and LD/HDPE co-polymer. In still another embodiment, the packaging laminates comprise a first polymeric layer comprising a HDPE or HDPE and Octene and a second polymeric layer comprising HDPE, LLDPE, LDPE, and/or LD/HDPE co-polymer. In another embodiment, the packaging laminates include a first polymeric layer including HDPE and an additional polyethylene, such as MDPE, and a second polymeric layer including HDPE, LLDPE, LDPE, and/or LD/HDPE co-polymer. In still another embodiment, the packaging laminates comprise a first polymeric layer, including HDPE and a second polymeric layer comprising LLDPE. In yet another embodiment, the packaging laminates comprise a first polymeric layer comprising MDPE and a second polymeric layer comprising HDPE LLDPE, LDPE, and/or and LD/HDPE co-polymer. In one aspect, the first polymeric layer is on the outside of the packaging laminate. In another aspect, disclosed herein are packaging laminates wherein the first polymeric layer is oriented to be on the inside layer of the packaging laminate.

While in its simplest form the multilayered polymeric films disclosed herein comprises two layers. However, it is fully contemplated herein that the multilayered polymeric film can comprise 1, 2, 3, 4, 5, 6, 7, 8, 9, 10, 11, 12, 13, 14, 15, 16, 17, 18, 29, 20, 25, 30, 35, 40, 45, or 50 or more additional polymer layers. Thus, in one aspect, disclosed herein are multilayered polymeric films comprising 2, 3, 4, 5, 6, 7, 8, 9, or 10 or more layers. For example, disclosed herein are multilayered polymeric films further comprising a third polymeric layer adjacent to the second layer and on the opposite side from the first layer. In one aspect, disclosed herein are packaging laminates, further comprising a third polymeric layer positioned between the first layer and the second layer. The third polymeric layer may include any type of polyethylene resin. For instance, the third polymeric layer may include HDPE, LDPE, LLDPE, or combinations thereof.

For example, disclosed herein are packaging laminates comprising a first polymeric layer comprising a polypropylene copolymer; and a second polymeric layer comprising a high density polyethylene (HDPE) resin (including, but not limited to an HDPE resin with a coextruded ethyl vinyl alcohol (EVOH) compatibilizer and/or an EVOH barrier), further comprising a third polymeric layer positioned between the first and second polymeric layer, wherein the third polymeric layer comprises HDPE, LDPE, and/or LLDPE. Additionally, disclosed herein are packaging laminates including a first polymeric layer including a HDPE resin and a second polymeric layer including a LLDPE resin (including a LLDPE resin that is coextruded ethyl vinyl alcohol compatibilizer (such as, for example Dow RETAIN® EVOH compatibilizer and/or an EVOH film barrier)), further including a third polymeric layer positioned between the first and second polymeric layer, wherein the third polymeric layer includes HDPE, LDPE, and/or LLDPE. Furthermore, disclosed herein are packaging laminates comprising a first polymeric layer comprising a high density polyethylene (HDPE) resin or a medium density polyethylene (MDPE) and a second polymeric layer comprising a low density/high density polyethylene (LD/HDPE) resin (including a LD/HDPE resin, that is coextruded ethyl vinyl alcohol compatibilizer (such, as, for example Dow RETAIN® EVOH compatibilizer and/or an EVOH film barrier)) further comprising a third polymeric layer positioned between the first and second polymeric layer, wherein the third polymeric layer comprises HDPE, LDPE, and/or LLDPE.

It is understood and herein contemplated that the individual polymeric layers can comprise the same or different portion of the multilayered polymeric film and that the ratio of individual layers can be modified to achieve different visual effects. For example each layer of a two layered film can comprise 50% of the film. Alternatively, one polymeric layer of a'two layered polymeric film can comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 33.33, 34, 35, 35.065, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64.935, 65, 66, 66.66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 percent of the multilayered film while the remaining layer comprises the remaining percentage of the multilayered film. For example, disclosed herein are packaging laminates wherein the first polymeric layer comprises about 35% of the thickness of the laminate (for example, a packaging laminate with a 1.35 MIL first polymeric layer and a 2.5 MIL second polymeric layer). In another aspect, the thickness of the polymeric layer of the packaging laminate can comprise about 20% of the thickness of the packaging laminate (for example a packaging laminate with a 0.8 MIL first layer and a 4.0 MIL second layer).

Similarly, in a three layered film each layer can comprise the same portion (i.e., a ⅓ portion) of the film structure, have two layers comprising the same portion of the film structure and the third layer being a different portion, or be independently proportioned. For example, it is disclosed herein that the first (i.e., the outer) layer and the third layer (middle layer) can each comprise 20% of the multilayered film (a total of 40%) while the second (outside layer) comprises the remaining 60% of the film. That is, any combination of layer ratios can exist in the multilayered film, including, but not limited to, an outer:middle:inner percentage of 5:90:5; 10:80:0; 15:70:15; 20:60:20; 25:50:25; 30:40:30; 35:30:35; 40:20:40; 45:10:45; 5:5:90; 10:10:80; 15:15:70; 20:20:60; 25:25:50; 30:30:40; 35:35:30; 40:40:20; 45:45:10; 90:5:5; 80:10:10; 70:15:15; 60:20:20; 50:25:25; 40:30:30; 30:35:35; 20:40:40; 10:45:45; 5:10:85; 10:15:75; 15:20:65; 20:25:55; 25:30:45; 10:5:85; 15:10:75; 20:15:65; 25:20:55; 30:25:45; 85:10:5; 75:15:10; 65:20:15; 55:25:20; 45:30:25; 85:5:10; 75:10:15; 65:15:20; 55:20:25; 45:25:30; 5:85:10; 10:75:15; 15:65:20; 20:55:25; 25:45:30; 10:85:5; 15:75:10; 20:65:15; 25:55:20; or 30:45:25 or any other combination (such as, for example, 42.1:31.6:26.3).

Typically the thickness of each polymeric layer of the packaging laminate is referenced in terms of MILs or gauge (GA, wherein 10 GA=0.1 MIL). In one aspect, the thickness of each polymeric layer can independently be from about 0.005 MIL to 6.0 MILs. That is each polymeric layer can be 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.25, 1.3, 1.35, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 MIL.

In one embodiment, the thickness of the first polymeric layer may be about 0.005 MIL to about 3 MIL. In another embodiment, the thickness of the first polymeric layer may be about 0.008 MIL to about 2 MIL. In still another embodiment, the thickness of the first polymeric layer may be about 0.5 MIL to about 1.5 MIL. In yet another embodiment, the thickness of the first polymeric layer may be between about 0.8 MIL to about 1 MIL.

The thickness of the second polymeric layer may be about 2 MIL to about 6 MIL. For instance, the thickness of the second polymeric layer may be about 2 MIL to about 5 MIL. In another embodiment, the thickness of the second polymeric layer may be about 2.5 MIL to 4 MIL. In yet another embodiment, the thickness of the second polymeric layer may be about 2.5 MIL to about 3.5 MIL. In still another embodiment, the thickness of the second polymeric layer may be about 3.5 MIL to about 6 MIL.

For example, the first polymeric layer can be between 0.4 and 2.5 MILs (for example 0.8 MIL, 1 MIL, or 1.35 MIL) and the second polymeric layer can be between 2 and 4 MILs (for example 2.5 MIL, 3.5 MIL, or 4.0 MIL). In one aspect the first polymeric layer can be 1.35 MIL and the second polymeric layer can be 2.5 MIL. In another embodiment, the first polymeric layer can be between 0.5 and 0.8 MILs and the second polymeric layer can be between 2 and 4 MIL. For instance, the first polymeric layer can be 0.8 MIL and the second polymeric layer can be 4.0 MIL. In another embodiment, the first polymeric layer can be between 0.5 and 1 MIL and the second polymeric layer can be between 2 and 3.75 MILs.

In an aspect comprising a further third polymeric layer (i.e., a middle or intermediate layer) the thickness of the third polymeric layer can be, for example, between 0.4 and 4 MILS. In another embodiment, the thickness of the third polymeric layer may be about 0.8 MIL to about 3 MIL. In still another embodiment, the thickness of the third polymeric layer may be about 1 MIL to about 2.5 MIL. In yet another embodiment, the thickness of the third polymeric layer may be about 1 MIL to about 2 MIL.

Accordingly, also disclosed herein is a trilaminate packaging laminate wherein the first polymeric layer is 0.8 MIL to 1.25 MIL, the second polymeric layer is 2.0 MIL to 3.5 MIL and the third (i.e., the middle or intermediate) polymeric layer is 1 MIL to 3 MIL.

The thicknesses disclosed herein advantageously allow for reverse printing on the packaging laminates. More specifically, due to the thinness of the first polymeric layer, printing may occur on the inside of the first polymeric layer such that any ink printing is protected from the outside environment. Reverse printing helps prevent scuffing or scraping of the ink.

Any known methods for reverse printing may be utilized in accordance with the present invention. For example, printing can be done by any known means using commercially available UV, Flexographic, UV Flexographic, water-based, solvent or other inks which result in complete adhesion of ink to the label surface (i.e., the print layer of the packaging laminate). Generally, reverse printing involves having the film layer to be reverse printed undergo treatment so that the film layer will accept ink. The film layer may undergo any suitable surface treatment including, but not limited to, corona discharge treatment, plasma treatment, UV treatment, and/or electron beam treatment. The surface treatment helps make the film layer porous, which allows for the film layer to accept ink more readily. Then, a negative of the design to be printed may be laminated onto the film layer such that the printing occurs on the inside of the film layer (or the reverse side of the label face). This process may be repeated for any layer of the packaging laminate that will display a label or design.

The packaging laminates disclosed herein are in one aspect, intended for use in packaging containers for perishable produces such as, for example, coffee beans or ground, coffee. In another embodiment, the packaging laminates disclosed herein are intended for use in packaging containers for pet food including dry pet food, semi-moist pet food, and moist pet food. In this aspect, the packaging containers may include a container body formed of the packaging laminates of the present invention.

In one aspect, it is contemplated herein packaging containers comprising the packaging laminates disclosed herein further comprising a valve for dispensing a product into and/or out of the packaging container. In one aspect the valve can be configured to allow for degassing (such as, for example comprising a degassing filter). The valve may be formed in a side wall of the container body during molding or production of the packaging container. In one embodiment, the valve may be permanently attached to the packaging container. In another embodiment, the valve may be removably attached to the packaging container.

In one embodiment, the valve is formed of a polymeric material utilized in one or more layers of the packaging laminates. For example, the valve may be formed of a polymeric material utilized in the first polymeric layer. In this aspect, the valve may be formed of one or more polypropylene, polypropylene co-polymers, LDPE, MDPE, HDPE, and/or LDPE/HDPE co-polymer resins. In one embodiment, the valve may be formed of MDPE, HDPE, or combinations thereof. In another embodiment, the valve is formed of HDPE. In still another embodiment, the valve is formed of MDPE.

To address the additional stress that could be placed on the valve, it is understood and herein contemplated that the thickness of the polymeric layers of the valve can be greater than the thickness of the polymeric layers of the packaging laminate.

In one embodiment the packaging laminate and/or the valve of the present invention are recyclable. Upon disposal of the packaging container, the packaging laminate and/or the valve of the present invention may be recycled. Indeed, the packaging laminate of the present invention and/or the valve of the present invention can be recyclable to the same extent that #2 HDPE film or #4 linear low density polyethylene (LLDPE) film is recyclable.

In this aspect, the recycled packaging laminate and/or valve may be reprocessed into a form suitable for producing new packaging films, laminates, or valves. The recycled packaging laminate and valve may undergo any known process for recycling film or plastic into new components. In one embodiment, the packaging laminate/valve to be recycled may be put into a shredder to grind and/or shred the material. The shredded packaging laminate/valve may then be run through an extruder where the plastic is incited and mixed. As the plastic exits the extruder, the plastic is subjected to a water bath where the plastic is cooled. The recycled plastic is then pelletized and dried in a dryer. To ensure that all moisture escapes, the pellets are stored for about 3 to 4 days to continue drying before post-blending occurs. The pellets formed from the recycled packaging laminate valve may be used to produce new packaging components.

In one embodiment, during processing, the recycled packaging laminate is combined with linear low-density polyethylene (LLDPE). In one embodiment, the recycled packaging laminate may be combined with at least 25 percent by weight of LLDPE. In another embodiment, the recycled packaging laminate may be combined with at least 40 percent by weight of LLDPE. In still another embodiment, the recycled packaging laminate may be combined with at least 50 percent by weight of LLDPE. In yet another embodiment, the recycled packaging laminate may be combined with at least 65 percent by weight of LLDPE. In another embodiment, the recycled packaging laminate may be combined with at least 75 percent by weight of LLDPE.

In one embodiment, as noted above, the recycled packaging laminate and the LLDPE may be reprocessed into pellet form. The resulting pellets formed from the recycled packaging laminate and the LLDPE demonstrate superior melt flow rates, volatile contents, ash contents, and peak melting temperatures such that the pellets can be used, for example, to produce injection molded parts, such as valves for packaging containers, and new films and laminates.

In one embodiment, the resulting pellets have a melt flow rate of at least 0.4 g/10 min. In another embodiment, the resulting pellets have a melt flow rate of at least 0.5 g/10 min. In still another embodiment, the resulting pellets have a melt flow rate of at least 0.6 g/10 min. In yet another embodiment, the resulting pellets have a melt flow rate of at least 0.7 g/10 min. The resulting pellets also show superior volatile contents. In one embodiment, the resulting pellets have a volatile content of less than 0.05 percent. In another embodiment, the resulting pellets have a volatile content of less than 0.025 percent. In still another embodiment, the resulting pellets have a volatile content of less than 0.01 percent. In yet another embodiment, the resulting pellets have a volatile content of less than 0.005 percent. The resulting pellets also demonstrate superior ash contents. "Ash content," as used herein, refers to the amount of filler content in the material. In one embodiment, the pellets have an ash content of less than 5 percent. In another embodiment, the pellets have an ash content of less than 3 percent. In still another embodiment, the pellets have an ash content of less than 1 percent. In yet another embodiment, the pellets have an ash content of less than 0.5 percent. Furthermore, the pellets demonstrate superior peak melting temperatures as measured by differential scanning calorimetry (DSC). For instance, the pellets have a peak melting temperature of less than 150° C., preferably less than 140° C., more preferably less than 130° C., and even more preferably less than 120° C.

In another embodiment, the resulting pellets may undergo further processing to form new packaging films, laminates, or valves. For instance, the resulting pellets may be injection molded into packaging components or formed into film or laminate materials. The packaging components formed from the recycled packaging laminate and LLDPE show superior physical and mechanical properties. For instance, the packaging components demonstrate superior flexural moduli. "Flexural modulus" or "flexural moduli" as used herein refers to the tendency for a material to resist bending as measured in accordance with ASTM D638. In one embodiment, the flexural modulus of the packaging components is less than 68,000 psi. In another embodiment, the flexural modulus of the packaging components is less than 65,000 psi. In still another embodiment, the flexural modulus of the packaging components is less than 62,000 psi. In yet another embodiment, the flexural modulus of the packaging components is less than 59,000 psi. The packaging components also demonstrate superior tensile strength. As used herein, "tensile strength" refers to the amount of stress a material can handle before reaching permanent, non-elastic deformation as measured in accordance with ASTM D638 or ASTM D882. In one embodiment, the tensile strength of the packaging components according to ASTM D638 is about 1020 psi to about 2385 psi. In another embodiment, the tensile strength of the packaging components according to ASTM D638 is about 1278 psi to about 2130 psi. In still another embodiment, the tensile strength of the packaging components according to ASTM D638 is about 1350 psi to about 1980 psi. In yet another embodiment, the tensile strength of the packaging components according to ASTM D638 is about 1500 psi to about 1850 psi.

Moreover, the packaging components have superior notched izod impact strengths. "Notched izod impact strengths" refer to the impact resistance of materials as measured in accordance with ASTM D256. In one embodiment, the notched izod impact strength of the packaging components is about 5 ft. lb/in to about 12 ft. lb/in. In another embodiment, the notched izod impact strength of the packaging components is about 6.4 ft. lb/in to about 10.6 ft. lb/in. In yet another embodiment, the notched izod impact strength of the packaging components is about 8 ft. lb/in to about 10 ft. lb/in. In still another embodiment, the notched izod impact strength of the packaging components is about 8.5 ft. lb/in to about 9.5 ft. lb/in. The packaging components also have good elongation at yield values. "Elongation at yield," as used herein, is the strain that the material undergoes at the yield point, or the percent change in length that occurs while the material is stressed to its yield point. In one embodiment, the packaging components may have an elongation at yield, of about 95 percent to about 218 percent. In another embodiment, the packaging components may have an elongation at yield of about 100 percent to about 195 percent. In still another embodiment, the packaging components may have an elongation at yield of about 110 percent to about 175 percent. In yet another embodiment, the packaging components may have an elongation at yield of about 120 percent to about 160 percent.

The recycled packaging laminate may also be recycled into new packaging laminates and films. The packaging laminates and films produced from the recycled packaging laminate demonstrate superior physical and mechanical properties. For example, the newly formed packaging laminates and films demonstrate superior tear strengths in the transverse direction (TD) and in the machine direction (MD). "Tear strength," as used herein, refers to the measurement of a material's ability to resist tearing as measured in accordance with ASTM D1922. In one embodiment, the newly formed packaging laminates and films have a tear strength (TD) of about 548 g to about 1280 g. In another embodiment, the newly formed packaging laminates and films have a tear strength (TD) of about 685 g to about 1143 g. In still another embodiment, the newly formed packaging laminates and films have a tear strength (TD) of about 750 g to about 1050 g. In yet another embodiment, the newly formed packaging laminates and films have a tear strength (TD) of about 800 g to about 910 g. The newly formed packaging laminates and films also have a tear strength (MD) of about 106 g to about 305 g. In another embodiment, the newly formed packaging laminates and films have a tear strength (MD) of about 133 g to about 248 g. In yet another embodiment, the newly formed packaging laminates and films have a tear strength (MD) of about 150 g to about 221 g. In still another embodiment, the newly formed packaging laminates and films have a tear strength (MD) of about 175 g to about 210 g.

In another embodiment, the newly formed packaging laminates and films have a tensile strength (TD) according to ASTM D882 of about 872 psi to about 2036 psi. In still another embodiment, the newly formed packaging laminates and films have a tensile strength (TD) according to ASTM D882 of about 1090 psi to about 1818 psi. In yet another embodiment, the newly formed packaging laminates and films have a tensile strength (TD) according to ASTM D882 of about 1200 psi to about 1650 psi. In another embodiment, the newly formed packaging laminates and films have a tensile strength (TD) according to ASTM D882 of about 1300 psi to about 1500 psi. The newly formed packaging laminates and films also have a tensile strength (MD) according to ASTM D882 of about 1356 psi to about 3164 psi. In another embodiment, the newly formed packaging laminates and films have a tensile strength (MD) according to ASTM D882 of about 1695 psi to 2825 psi. In still another embodiment, the newly formed packaging laminates and films have a tensile strength (MD) according to ASTM D882 of about 1750 psi to about 2500 psi. In yet another embodiment, the newly formed packaging laminates and films have a tensile strength (MD) according to ASTM D882 of about 1900 psi to about 2300 psi.

The newly formed packaging laminates and films also have superior elongation at yield values. In one embodiment, the formed packaging laminates and films have an elongation at yield (MD) according to ASTM D882 of about 8 inches to about 18 inches. In another embodiment, the formed packaging laminates and films have an elongation at yield (MD) according to ASTM D882 of about 10 inches to about 16 inches. In still another embodiment, the formed packaging laminates and films have an elongation at yield (MD) according to ASTM D882 of about 11 inches to about 14 inches. In yet another embodiment, the formed packaging laminates and films have an elongation at yield (MD) according to ASTM D882 of about 12 inches to about 13.5 inches. The formed packaging laminates and films also have an elongation at yield (TD) according to ASTM D882 of about 0.39 inches to about 0.91 inches. In another embodiment, the formed packaging laminates and films have an elongation at yield (TD) according to ASTM D882 of about 0.45 inches to about 0.80 inches. In still another embodiment, the formed packaging laminates and films have an elongation at yield (TD) according to ASTM D882 of about 0.50 inches to about 0.60 inches.

Furthermore, the newly formed packaging laminates and films have superior Dart impact values. "Dart impact" refers to the amount of impact strength or toughness of the film as measured in accordance with ASTM D1709. In one embodiment, the laminates and films have a dart impact of about 50 g/mil to about 245 g/mil. In another embodiment, the laminates and films have a dart impact of about 75 g/mil to about 219 g/mil. In still another embodiment, the laminates and films have a dart impact of about 100 g/mil to about 200 g/mil. In yet another embodiment, the laminates and films have a dart impact of about 100 g/mil to about 150 g/mil. The newly formed packaging laminates and films also have superior haze values. For example, the newly formed packaging laminates and films have haze values according to ASTM D1003 of about 10 percent to about 70 percent. In another embodiment, the newly formed packaging laminates and films have haze values of about 15 percent to about 60 percent. In still another embodiment, the newly formed packaging laminates and films have haze values of about 20 percent to about 50 percent.

In addition to being recyclable, the packaging laminates of the present invention provide extended shelf lives for contents within the packaging containers. For instance, the packaging laminates preserve the shelf life of perishable produces such as, for example, coffee beans or ground coffee. As used herein, "shelf life" refers to the length of time for which a perishable item remains usable and fit for consumption. Without being bound by any particular theory, it is believed that the packaging laminates of the present invention regulate the internal atmosphere of the packaging container and prevent oxygen transmission into the container. Indeed, in one embodiment, the percentage of residual oxygen within packaging containers having a packaging laminate according to the present invention over a time period of 52 weeks is about 2.65 percent or less, preferably about 1.85 percent or less, more preferably about 1.15 percent or less, and even more preferably about 0.95 percent or less.

In one embodiment, when the packaging laminates of the present invention are utilized in a packaging container, the contents of the packaging container have a shelf life of about 6 weeks or greater. In another embodiment, the contents of the packaging container have a shelf life of about 18 weeks or greater. In still another embodiment, the contents of the packaging container have a shelf life of about 24 weeks or greater. In yet another embodiment, the contents of the packaging container have a shelf life of about 35 weeks or greater. In another embodiment, the contents of the packaging container have a shelf life of about 52 weeks or greater.

The packaging laminate of the present invention can be filled and sealed by conventional vertical and/or horizontal, automated bagging machines.

EXAMPLES

Example 1

Inventive Packaging Laminates

FIG. 1 illustrates a first embodiment of a packaging laminate 10 in accordance with the present invention. The packaging laminate 10 has two layers including an outside layer 12 and an inside layer 14. When the packaging laminate is used to form a food package for holding food products, the inside layer 14 is positioned next to the food product, and the outside layer 12 is the outside of the food package.

The outside layer 12 of the packaging laminate 10 is a PP copolymer film having a thickness in the range 0.4 mil-2.5 mils. The inside layer 14 of the packaging laminate 10 is a high density polyethylene (HDPE) film with a coextruded EVOH film barrier and EVOH compatibilizer (such as Dow RETAIN® EVOH compatibilizer). The inside layer 14 has a thickness in the range 1.25 mils-6.0 mils. One particularly advantageous embodiment of the packaging laminate 10, shown in FIG. 1, has an outside layer thickness of 1.35 mils and an inside layer thickness of 2.5 mils.

The properties of the packaging laminate 10, shown in FIG. 1, are set forth in Table 3 below.

TABLE 3

| Description | Units | Results | Method |
| --- | --- | --- | --- |
| Tensile at Break TD | Grams | 2500 | ASTM D882 |
| Tensile at Break MD | Grams | 4500 | ASTM 0882 |
| Elongation at Break-TD | % | 720 | ASTM 0882 |
| Elongation at Break-MD | % | 740 | ASTM 0882 |
| Elmendorf Tear (TD) | Grams | 700 | ASTM 0882 |
| Elmendorf Tear (MD) | Grams | 200 | ASTM 0882 |
| Oxygen Transmission | cc/100 in2/day | 0.23 | ASTM 03985 |

With respect to the terms used in Table 3 above and Tables 4 and 5 below:
 a. "Tensile at Break TD" specifies the force applied in grams in order to break the packaging laminate in its machine direction (MD).
 b. "Tensile at Break MD" specifies the three applied in grams in order to break the packaging laminate in its transverse direction (TD).
 c. "Elongation at Break TD" specifies the percentage of elongation of the packaging laminate at break in its TD.
 d. "Elongation at Break MD" specifies the percentage of elongation of the packaging laminate at break in its MD.
 e. "Oxygen Transmission" specifies the amount of oxygen in cubic centimeters transferred through a 100 in.$^2$ area of the packaging laminate in a 24-hour period.
 f. "Water Vapor Transmission" specifies the amount of water vapor in grams transferred through a 100 in.$^2$ area of the packaging laminate in a 24-hour period.

Figure 2:
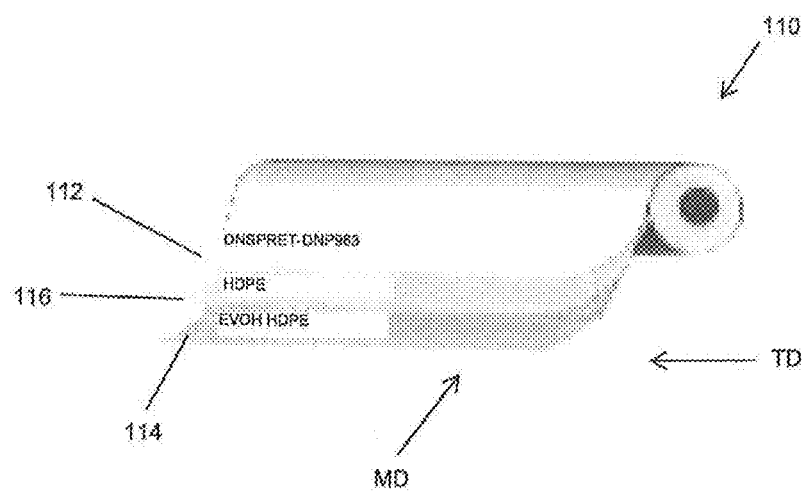
FIG. 2 is a perspective drawing of a second embodiment of a packaging laminate in accordance with the present invention.

FIG. 2 illustrates a second embodiment of a packaging laminate 110 in accordance with the present invention. The packaging laminate 110 has three layers including an outside layer 112 which is a PP copolymer film, an inside layer 114 which is an HDPE with a coextruded EVOH film barrier and EVOH compatibilizer (Such as Dow RETAIN® EVOH compatibilizer), and a middle layer 116 which comprises HDPE. When the packaging laminate 110 is used to form a food package for holding food products, the inside layer 114 is positioned next to the food product and the outside layer 112 is the outside of the food package.

The outside layer 112 of the packaging laminate 110 having a thickness in the range 0.4 mil-2.5 mils. The inside layer 114 has a thickness in the range 1.25 mils-6.0 mils. The middle layer 116 of the packaging laminate 110 is having a thickness in the range 0.8 mil-4.5 mils.

Figure 3:
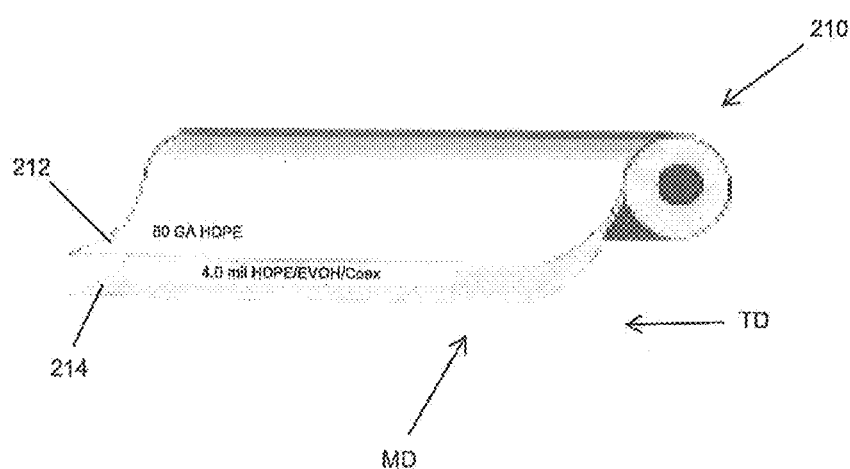
FIG. 3 is a perspective drawing of a third embodiment of a packaging laminate in accordance with the present invention.

FIG. 3 illustrates a third embodiment of a packaging laminate 210 in accordance with the present invention. The packaging laminate 210 has two layers including an outside layer 212 comprising HDPE or HDPE and Octene (for example, 80% weight HDPE and 20% weight Octene) and an inside layer 214 comprising HDPE with a coextruded EVOH film barrier and EVOH compatibilizer (such as Dow RETAIN® EVOH compatibilizer). When the packaging laminate 310 is used to form a food package for holding food products, the inside layer 214 is positioned next to the food product, and the outside layer 212 is the outside of the food package.

The outside layer 212 of the packaging laminate 210 is a HDPE or HDPE and Octene film having a thickness in the range 0.4 mil-2.5 mils. The inside layer 214 of the packaging laminate 210 is a LD/HDPE film with a coextruded EVOH film barrier. The inside layer 114 has a thickness in the range 1.25 mils-6.0 mils. One particularly advantageous embodiment, shown in FIG. 3, has an outside layer thickness of 0.80 mils and an inside layer thickness of 4.0 mils.

The properties of the packaging laminate 210, shown, in FIG. 3, are set forth in Table 4 below.

TABLE 4

| Description | Units | Results | Method |
| --- | --- | --- | --- |
| C.O.F. Outside | Kinetic | 0.25 | ASTM D1894 |
| C.O.F. Inside (Seal Side) | Kinetic | 0.15 | ASTM D1894 |
| Tensile at Break TD | Grams | 3500 | ASTM D882 |
| Tensile at Break MD | Grams | 3200 | ASTM 0882 |
| Elongation at Break-TD | % | 400 | ASTM 0882 |
| Elongation at Break-MD | % | 150 | ASTM 0882 |
| Oxygen Transmission | cc/100 in2/day | 0.1 | ASTM 03985 |
| Water Vapor Transmission | gm/100 in2/day | 0.1 | ASTM F1249 |

In Table 4 above:
a. "C.O.F. Outside" means the coefficient of friction for the outside surface of the outside layer 212 of the laminate 210.
b. "C.O.F. Inside (Seal Side)" means the coefficient of friction for the inside surface of the inside layer 214 of the laminate 210.

Figure 4:
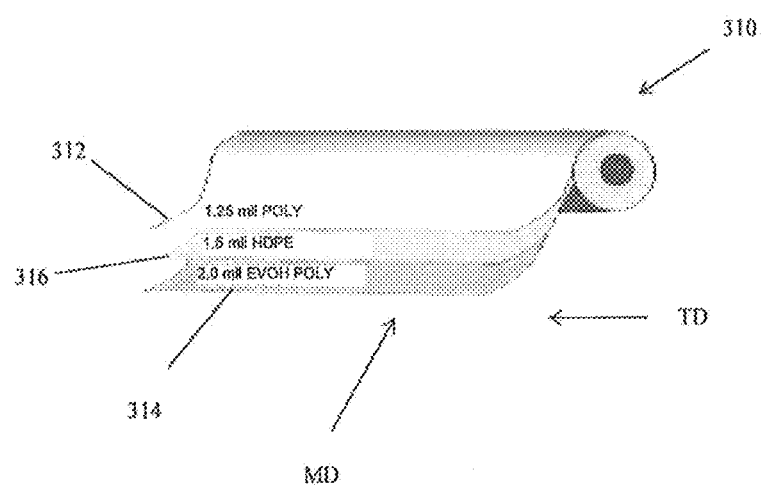
FIG. 4 is a perspective drawing of a fourth embodiment of a packaging laminate in accordance with the present invention.

FIG. 4 illustrates a fourth embodiment of a packaging laminate 310 in accordance with the present invention. The outside layer 312 of the packaging laminate 310 is a PE film having a thickness in the range 0.4 mil-2.5 mils. The inside layer 314 of the packaging laminate 310 is a low density/high density polyethylene (LD/HDPE) film with a coextruded EVOH film barrier. The inside layer 314 has a thickness in the range 1.25 mils-6.0 mils. The middle layer 16 of the packaging laminate 310 is a HDPE film having a thickness in the range 0.8 mil-4.5 mils. One particularly advantageous embodiment of the packaging laminate 10, shown in FIG. 1, has an outside layer thickness of 1.25 mils, an inside layer thickness of 2.0 mils, and a middle layer thickness of 1.5 mils. In an alternative embodiment, the thickness of the inside, outside, and middle layers, can be 0.8 mils (i.e., 80 GA), 2.0 mils, and 1.5 mils, respectively.

The properties of the packaging laminate 310, shown in FIG. 4, are set forth in Table 5 below.

TABLE 5

| Description | Units | Results | Method |
| --- | --- | --- | --- |
| Tensile at Break TD | Grams | 4800 | ASTM D882 |
| Tensile at Break MD | Grams | 4500 | ASTM 0882 |
| Elongation at Break-TD | % | 750 | ASTM 0882 |
| Elongation at Break-MD | % | 700 | ASTM 0882 |
| Oxygen Transmission | cc/100 in2/day | 0.24 | ASTM 03985 |
| Water Vapor Transmission | gm/100 in2/day | 8 | ASTM F1249 |

Figure 5:
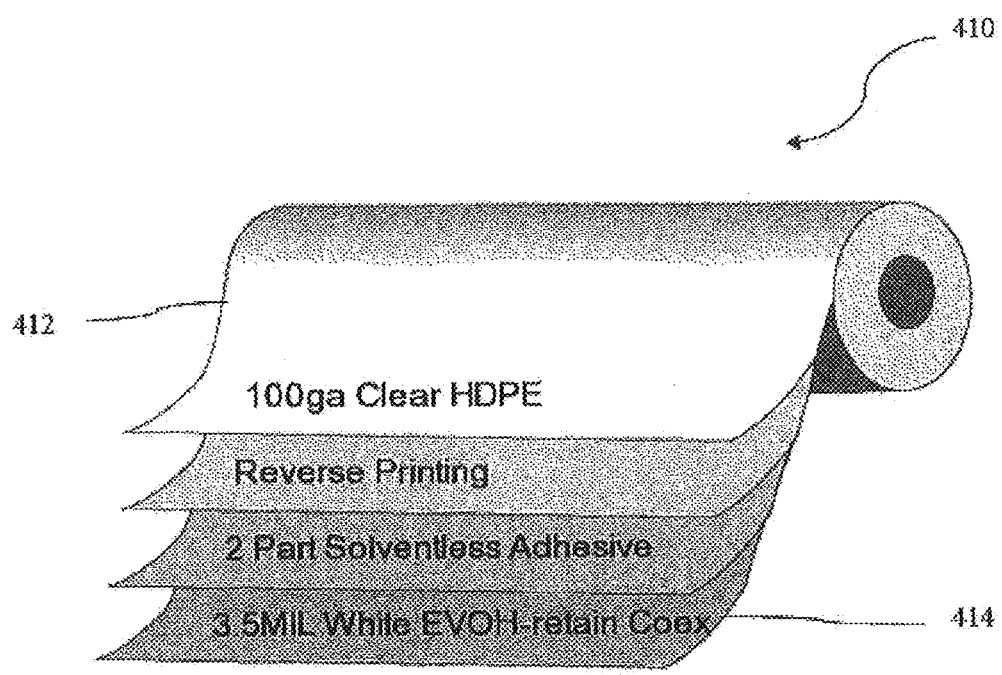
FIG. 5 is a perspective drawing of fifth embodiment of a packaging laminate in accordance with the present invention.

FIG. 5 illustrates a fifth embodiment of a packaging laminate 410 in accordance with the present invention. The outside layer 412 of the packaging laminate 410 is a HDPE film having a thickness of 100 ga (or 1 MIL). The outside layer 412 underwent reverse printing such that the ink printing is on the inside of the outside layer 412. The inside layer 414 of the packaging laminate 410 is a white LLDPE resin co-extruded with an EVOH barrier and an EVOH compatibilizer (such as Dow RETAIN® EVOH compatibilizer). The inside layer 414 has a thickness of 3.5 MIL. The packaging laminate 410 also included 2 parts solventless adhesive.

The properties of the packaging laminate 410, shown in FIG. 5, are set forth in Table 6 below.

TABLE 6

| Description | Units | Results | Method |
| --- | --- | --- | --- |
| Thickness | Mils | 4.5 | ASTM D5947 |
| C.O.F. Outside | Kinetic | .2 | ASTM D1894 |
| C.O.F. INSIDE (Seal Side) | Kinetic | .2 | ASTM D1894 |
| Tensile at Break MD | Grams | 700 | ASTM D882 |
| Oxygen Transmission | cc/100 in2/day | .25 | ASTM D3985 |
| Opacity | % | 75 | ASTM D6216 |
| Dwell Time | Seconds | .5 | |
| Seal Strength | Grams | 350 | ASTM F88/F88M-09 |
| Seal Pressure | PSI | 40 | |
| Seal Temp | Farenheit | 275 | |
| Lamination Bond 1 | Grams | 400 | 40 ASTM D 1876-01 |

As can be seen from Table 6, the packaging laminate 410 demonstrated excellent hot tack and seal strength and excellent oxygen and moisture barrier properties. The packaging laminate 410 also met FDA requirements for direct and indirect food contact.

Figure 6:
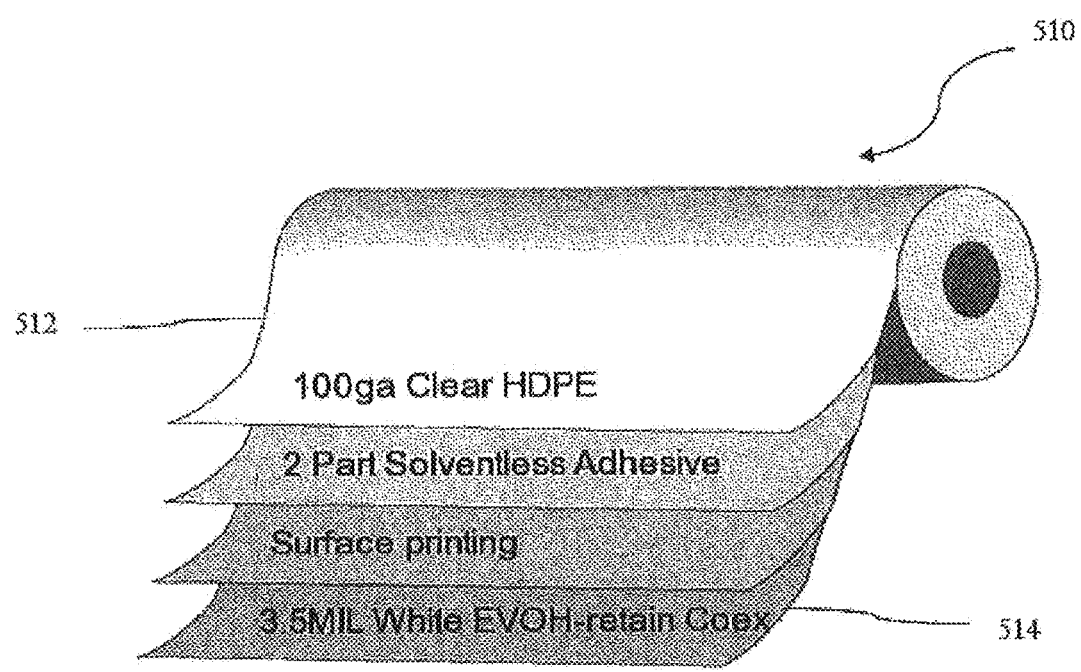
FIG. 6 is a perspective drawing of a sixth embodiment of a packaging laminate in accordance with the present invention.

FIG. 6 illustrates a sixth embodiment of a packaging laminate 510 in accordance with the present invention. The outside layer 512 of the packaging laminate 510 is a HDPE film having a thickness of 100 ga (or 1 MIL). The outside layer 512 underwent surface printing. The inside layer 514 of the packaging laminate 510 is a white LLDPE resin co-extruded with an EVOH barrier and an EVOH compatibilizer (such as Dow RETAIN® EVOH, compatibilizer). The inside layer 514 has a thickness of 3.5 MIL. The packaging laminate 510 also included 2 parts solventless adhesive.

The properties of the packaging laminate 510, shown in FIG. 6, are set forth in Table 7 Below.

TABLE 7

| Description | Units | Results | Method |
|---|---|---|---|
| Thickness | Mils | 4.5 | ASTM D5947 |
| C.O.F. Outside | Kinetic | .2 | ASTM D1894 |
| C.O.F. INSIDE (Seal Side) | Kinetic | .2 | ASTM D1894 |
| Tensile at Break MD | Grams | 7000 | ASTM D882 |
| Oxygen Transmission | cc/100 in2/day | .25 | ASTM D3985 |
| Opacity | % | 75 | ASTM D6216 |
| Dwell Time | Seconds | .5 | |
| Seal Strength | Grams | 3500 | ASTM F88/ F88M-09 |
| Seal Pressure | PSI | 40 | |
| Seal Temp | Farenheit | 275 | |
| Lamination Bond 1 | Grams | 400 400 | ASTM D 1876-01 |

As can be seen from Table 7, the packaging laminate 510 demonstrated excellent hot tack and seal strength and excellent oxygen and moisture barrier properties. The packaging laminate 510 also met FDA requirements for direct and indirect food contact.

Example 2

Shelf Life Studies

Figure 7:
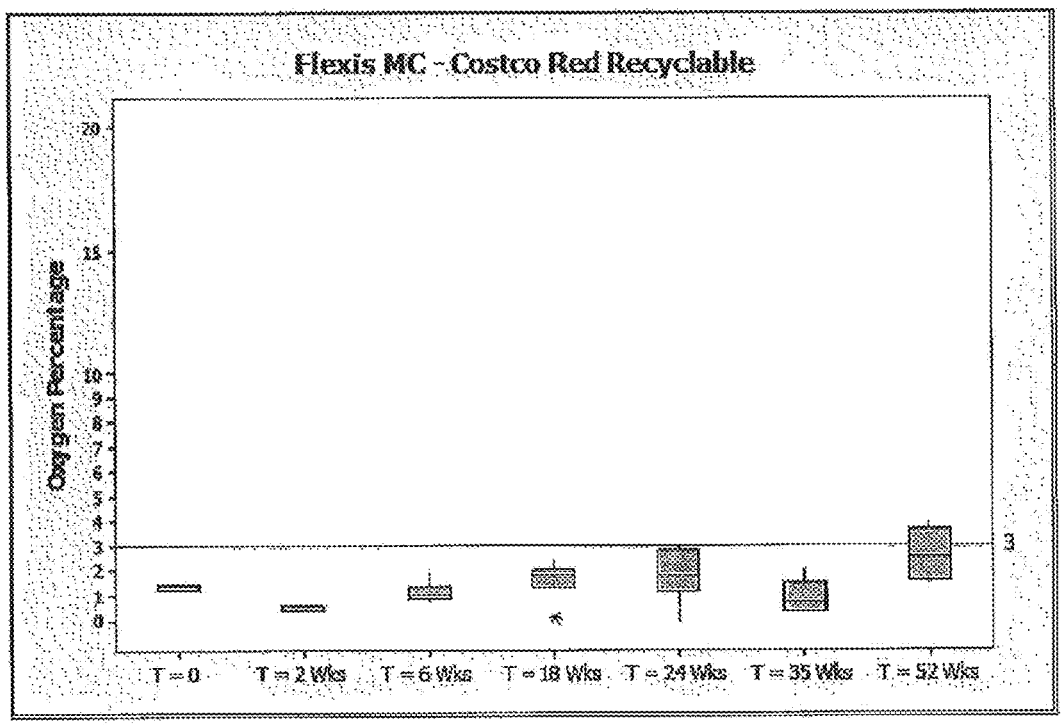
FIG. 7 is a graph showing shelf life data of packaging containers having a packaging laminate in accordance with the present invention.

Packaging containers having packaging, laminates according to the present invention were tested for residual oxygen over a time period of 0 weeks to 52 weeks. The packaging laminate was composed of a first polymeric layer including HDPE and a second polymeric layer including a LLDPE resin co-extruded with an EVOH barrier and an EVOH compatibilizer (such as Dow RETAIN® EVOH compatibilizer). Each of the packaging containers contained 3 pounds of coffee beans. A Flexis MC valve was also attached to each packaging container. The results of the testing are set forth in Table 8 below. FIG. 7 also shows the residual oxygen percentage over the 52 week time period.

TABLE 8

| | T = 0 | T = 2 Wks | T = 6 Wks | T = 18 Wks | T = 24 Wks | T = 35 Wks | T = 52 Wks |
|---|---|---|---|---|---|---|---|
| # of Bags | 2 | 6 | 6 | 6 | 6 | 6 | 6 |
| Average O$_2$ | 1.36% | 0.53% | 1.15% | 1.63% | 1.83% | 0.92% | 2.63% |
| # O$_2$ Failures | 0 | 0 | 0 | 1 | 2 | 1 | 3 |

As can be seen from the results, the residual oxygen content within the packaging container remained at or below 3 percent over the course of 52 weeks. Thus, the packaging containers having packaging laminates according to the present invention were able to preserve perishable products, such as coffee beans, for at least 52 weeks.

Example 3

Evaluating Recyclability of the Packaging Laminates in Producing Pellets and Injection Molded Parts The following example demonstrates the recyclability of the packaging laminates according to the present invention. As shown below, the packaging laminates of the present invention may be recycled and reprocessed into pellets, which may be used to produce injection molded parts (such as valves for packaging containers) having superior physical and mechanical properties.

Materials & Equipment

The following materials were evaluated for recyclability:

| | |
|---|---|
| Control Film | LLDPE Control Film (Monolayer) No additives, layers, print, or color |
| Test Film 1 (Test 1) | 1.35 mil copolymer with polypropylene Solvent based inks and adhesion 2.5 mil DOW recycle ready EVOH LLDPE |
| Inventive Test Film 2 (Test 2) | 80 ga HDPE (high molecular weight) 1.25 mil HDPE Solvent based inks and adhesions 2 mil DOW recycle ready EVOH LLDPE |

The following recycle system was used to evaluate the recyclability of the materials; Grinder with ⅜' screen; desiccant dryer; pellet extrusion; Arburg Injection Machine with a ASTM part mold; Instron Universal Testing Machine; Tinius Olsen. Extrusion Plastometer; Konica Minolta CM-3600d spectrophotometer; and Metler Toledo Density.

Pellet Processing

Each of the films were reprocessed into pellet form. During, processing of the pellets, test films 1 and 2 were each, combined with linear low-density polyethylene (LLDPE). For the first run, test films 1 and 2 were each used in an amount of 25% by weight and combined with 75% by weight LLDPE. For the second run, test films 1 and 2 were each used in an amount of 50% by weight and combined with 50% by weight LLDPE. Table 9 shows the extrusion temperature and pressure data.

TABLE 9

| | Control | Test 1 25% | Test 1 50% |
|---|---|---|---|
| AVG. Melt Temperature ° F. | 396 | 398 | 195 |
| AVG. Pressure PSI | 137 | 272 | 350 |

| | Control | Test 2 25% | Test 2 50% |
|---|---|---|---|
| AVG. Melt Temperature ° F. | 396 | 390 | 393 |
| AVG. Pressure PSI | 137 | 125 | 161 |

The resulting pellets were then run through an extrusion plastometer at 190° C. to measure the melt flow. The resulting measurements shown in Table 10 are displayed in units of g/10 min.

TABLE 10

| AVG. Melt Flow Rate | Control (0%) | Test 1 25% | Test 1 50% |
|---|---|---|---|
| 190° C. | 0.758 | 0.582 | 0.389 |

| AVG. Melt Flow Rate | Control (0%) | Test 2 25% | Test 2 50% |
|---|---|---|---|
| 190° C. | 0.758 | 0.674 | 0.512 |

The resulting pellets were also measured for volatile content using an AZI Computrac moisture analyzer (for 10 grams of air-dried pellet exposed to 160° C. for 10 minutes). Table 11 below shows the average volatile percentage.

TABLE 11

| | Control | Test 1 25% | Test 1 50% |
|---|---|---|---|
| AVG. Volatile % at 160° C. | 0.0038% | 0.0184% | 0.0246% |

| | Control | Test 2 25% | Test 2 50% |
|---|---|---|---|
| AVG. Volatile % at 160° C. | 0.0038% | 0.0273% | 0.0301% |

The pellets were farther measured for Ash percentage using a Thermo-Scientific FB1415M Muffle Furnace at 800° C. for 5 minutes. Table 12 below sets forth the average Ash percentage for the pellets.

TABLE 12

| | Control | Test 1 25% | Test 1 50% |
|---|---|---|---|
| AVG. Ash % | 0.12% | 1.69% | 2.57% |

| | Control | Test 2 25% | Test 2 50% |
|---|---|---|---|
| AVG. Ash % | 0.10% | 1.76% | 2.86% |

The peak melting temperature of the pellets was measured using differential scanning calorimetry (DSC). Table 13 sets forth the peak melting temperatures of the pellets.

TABLE 13

| | Control | Test 1 50% | Test 2 50% |
|---|---|---|---|
| Peak Melting Temp. | 122.19° C. | 176.07° C. | 145.01° C. |

Injection Molding Processing

Pellets of test films 1 and 2 and pellets of the control film were injection molded into ASTM test parts to measure flexural modulus, tensile strength, and notched Izod. The processing conditions did not change from one variable to the other.

A three-point bend test was used to measure the flexural modulus on all variables. The test was performed in accordance to ASTM D790. The results are shown below in Table 14.

TABLE 14

| | Control | Test 1 25% | Test 1 50% |
|---|---|---|---|
| AVG. Flexural Modulus (psi) | 58405 | 53151 | 72310 |

| | Control | Test 2 25% | Test 2 50% |
|---|---|---|---|
| AVG. Flexural Modulus (psi) | 58405 | 61926 | 67480 |

All variables were tested for tensile strength at yield which is the stress a material can handle before reaching permanent deformation. The test was performed in accordance to ASTM D638. The tensile test results are shown below in Table 15.

TABLE 15

| | Control | Test 1 25% | Test 1 50% |
|---|---|---|---|
| AVG. Tensile @ Yield (psi) | 1704 | 1510 | 1781 |

| | Control | Test 2 25% | Test 2 50% |
|---|---|---|---|
| AVG. Tensile @ Yield (psi) | 1704 | 1878 | 1954 |

Using the injection molded impact bars, izod impact testing in accordance to ASTM D256 was performed on all variables. The specimens were notched in the center of the test bar before being subjected to the 1.22 pound pendulum. The notched izod tests are shown in Table 16 below.

TABLE 16

| | Control | Test 1 25% | Test 1 50% |
|---|---|---|---|
| Notch Izod (ft-lb/in) | 8.50 | 9.75 | 10.61 |

| | Control | Test 2 25% | Test 2 50% |
|---|---|---|---|
| Notch Izod (ft-lb/in) | 8.5 | 10.49 | 10.88 |

Example 4

Evaluating Recyclability of the Packaging Laminates in Producing New Films

The following example demonstrates the recyclability of the packaging laminates according to the present invention. As shown below, the packaging laminates of the present invention may be recycled and reprocessed into new films and laminates having superior physical and mechanical properties.

Materials

The following film materials were evaluated for recyclability and reprocessability:

| Resin | % Total in Virgin and Control |
|---|---|
| Virgin Base Film Make Up | |
| Polyethylene Octene | 60 |
| Metallocene | 30 |
| Antiblock2/Slip1 | 10 |
| V1 Base Film Make Up | |
| Copolymer Polypropylene (3.8% Ethylene) | 45 |
| Metallocene | 30.2 |
| High Density Polyethylene | 16.8 |
| Low Density Polyethylene | 6 |
| Slip | 1.2 |
| Antiblock | 0.8 |
| Inventive V2 Base Film Make Up | |
| High Density Polyethylene | 66.6 |
| Surlyn | 10.23 |
| Tie | 6.5 |
| Metallocene | 5.9 |
| EVOH | 5 |
| Dow Retain EVOH Compatibilizer | 5 |
| Antiblock | 0.55 |
| Slip | 0.22 |

The above-noted films were blended for production into new films. The film material blends were as follows:

Virgin Material Blend
Octene 60%/Metallocene 30%
Antiblock2/Slip1 10%
0% PFE Repro at 50% with 50% Virgin Material Blend
Octene 30%/Metallocene 15%
Antiblock2/Slip1 5%
0% Repro PFE Material 50%
V2 25% PFE Repro at 50% with 50% Virgin Material Blend
Octene 30%/Metallocene 15%
Antiblock2/Slip1 5%
V2 25% Repro PFE Material 50%
V2 50% PFE Repro at 50% with 50% Virgin Material Blend
Octene 30%/Metallocene 15%
Antiblock2/Slip1 5%
V2 50% Repro PFE Material 50%
V1 25% PFE Repro at 50% with 50% Virgin Material Blend
Octene 30%/Metallocene 15%
Antiblock2/Slip1 5%
V1 25% Repro PFE Material 50%
V1 50% PFE Repro at 50% with 50% Virgin Material Blend
Octene 30%/Metallocene 15%
Antiblock2/Slip1 5%
V1 50% Repro PFE Material 50%

Procedure & Equipment

The equipment was started and all heat profiles and air flow were stabilized. The material % feed was prepared to meet the blends noted above. Once confirmed and recorded, the trials began and samples were produced for the following blends: Virgin Material Blend; 0% PFE Repro at 50% with 50% Virgin Material Blend, V2 25% PFE Repro at 50% with 50% Virgin Material Blend; 50% PFE Repro at 50% with 50% Virgin Material Blend; V1 25% PFE Repro at 50% with 50% Virgin Material Blend; and V1 50% PFE Repro at 50% with 5.0% Virgin Material Blend. The film samples were prepared for testing at a thickness of 1.5 mil and a 3.2 BUR. Testing was completed per the ASTM requirements.

The following equipment was utilized during the film production: Maguire Material Blender; Kirion™ 40 Extrusion Line; 80 mm die with a blow-up ratio of 3.2 with a lay flat of 16 inches (bubble diameter of 10.1 inches); and a tower cage and roller system.

Table 17 below shows the extruder conditions during processing of the films.

TABLE 17

| | Virgin | 0% | V1-25 | V1-50 | V2-25 | V2-50 |
|---|---|---|---|---|---|---|
| Process Conditions | | | | | | |
| Blower Air Ring % | 40 | 40 | 40 | 40 | 40 | 40 |
| Width Set (in) | 20 | 20 | 20 | 20 | 20 | 20 |
| Basket Diameter (in) | 18.22 | 18.22 | 18.22 | 18.22 | 18.22 | 18.22 |
| Cage Height (in) | 9 | 9 | 9 | 9 | 9 | 9 |
| Extruder Conditions | | | | | | |
| Rot Speed RPM | 146.8 | 146.8 | 146.8 | 146.8 | 146.8 | 146.8 |
| Load % | 54 | 49 | 53 | 49 | 47 | 50 |
| Melt Temp ° F. | 387 | 397 | 395 | 397 | 397 | 398 |
| Melt Pressure (psi) | 1593 | 1412 | 1418 | 1419 | 1453 | 1518 |
| Difference Pressure (psi) | 1539 | 1412 | 1418 | 1419 | 1453 | 1518 |
| Set (ft/m) | 103 | 99 | 94 | 94 | 94 | 94 |
| Temperature Profile | | | | | | |
| Feeder | 375 | 373 | 373 | 373 | 373 | 373 |
| Extruder Barrel 1 | 375 | 385 | 385 | 385 | 385 | 385 |
| Extruder Barrel 2 | 384 | 394 | 395 | 395 | 395 | 395 |
| Extruder Barrel 6 | 385 | 405 | 398 | 400 | 404 | 399 |
| Blown Film Die 1 | 400 | 400 | 400 | 400 | 400 | 400 |
| Blown Film Die 2 | 400 | 400 | 400 | 400 | 400 | 400 |
| Blown Film Die 3 | 400 | 400 | 400 | 400 | 400 | 400 |

Results of Film Production

The film material blends were recycled and produced into new films. The physical and mechanical properties of the newly formed films are shown in Table 18 below.

TABLE 18

| Assessment | Results | | | | | |
|---|---|---|---|---|---|---|
| | Virgin | 0% | V1-25% | V1-50% | V2-2% | V2-50% |
| Thickness ASTM D6988 (in.) | 0.00163 | 0.00143 | 0.00176 | 0.00175 | 0.00157 | 0.00164 |
| Tear Strength (MD) ASTM D1922 (g) | 426.67 | 177.47 | 317.17 | 391.33 | 206.67 | 301.67 |
| Tear Strength (TD) ASTM D1922 (g) | 927.67 | 913.63 | 912.83 | 926.67 | 871.43 | 831.33 |
| Tensile Strength (MD) ASTM D882 (psi) | 1583.84 | 2259.91 | 1728.79 | 1856.95 | 2046.28 | 1872.36 |
| Tensile Strength (TD) ASTM D882 (psi) | 1456.24 | 1453.85 | 1488.64 | 1502.29 | 1454.78 | 1513.01 |
| Elongation at Yield (MD) ASTM D882 (in.) | 13.24 | 13.22 | 13.44 | 13.36 | 13.22 | 13.29 |
| Elongation at Yield (MB) ASTM D882 (%) | 264.8 | 264.4 | 268.8 | 267.2 | 264.4 | 265.8 |
| Elongation at Yield (TD) ASTM D882 (in.) | 0.67 | 0.65 | 0.61 | 0.51 | 0.50 | 0.45 |
| Elongation at Yield (TD) ASTM D882 (%) | 13.4 | 13 | 12.2 | 10.2 | 10 | 9 |
| Dart Impact ASTM D1709 | 175 | 100 | 110 | 100 | 100 | 50 |
| Haze ASTM D1003 | 15.43 | 11.30 | 39.23 | 57.20 | 40.87 | 69.53 |

As can be seen from the above results, the films formed from the recycled packaging laminates of the present invention demonstrated superior physical and mechanical properties. As such, the packaging laminates of the present invention are able to be fully recycled into new packaging laminates and films.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A packaging container, comprising:
   a container body formed of a packaging laminate, wherein the packaging laminate comprises:
   a first layer, constituting an outer layer of the packaging laminate, comprising a high density polyethylene (HDPE) resin, wherein the first layer comprises a first side and a second side, and wherein the second side of the first layer comprises reverse printing;
   a second layer adjacent the second side of the first layer, constituting an inner layer of the packaging laminate, comprising a linear low density polyethylene (LLDPE) resin with a coextruded ethyl vinyl alcohol (EVOH) film barrier, and a metallocene catalyst present in an amount of about 5 to 33 percent by weight of the second layer; and
   a degassing valve removably attached to the container body, wherein the degassing valve comprises HDPE, and
   wherein the first layer has a thickness of about 0.5 MTh to about 1.5 MTh and the second layer has a thickness of about 2 MTh to about 5 MIL.

2. The packaging container of claim 1, wherein the HDPE comprises between 75 and 100 percent by weight of the first layer.

3. The packaging container of claim 2, wherein the first layer further comprises octene in an amount of 8 to 20 percent by weight of the first layer.

4. The packaging container of claim 1, wherein the first layer further comprises a calcium carbonate filler.

5. A packaging container, comprising:
   a container body formed of a packaging laminate, wherein the packaging laminate comprises:
   a print layer, constituting an outer layer of the packaging laminate, comprising a high density polyethylene (HDPE) resin, wherein the print layer comprises a first side and second side, and wherein the second side comprises reverse printing,
   a core layer adjacent the second side of the print layer, constituting an intermediate layer of the packaging laminate, comprising a HDPE resin, a linear low density polyethylene (LLDPE) resin, a low density polyethylene (LDPE) resin, or combinations thereof, and a sealant layer, constituting an inner layer of the packaging laminate, comprising a LLDPE resin with a coextruded ethyl vinyl alcohol (EVOH) film barrier, EVOH compatibilizer, and a catalyst present in an amount of about 5 to 33 percent by weight of the sealant layer, and a degassing valve removably attached to a wall of the container body, and wherein the print layer has a thickness of about 0.8 MTh to about 2.5 MIL, the sealant layer has a thickness of about 2 MTh to about 4 MIL, and the core layer has a thickness of about 0.4 MTh to about 4 MTh.

6. The packaging container of claim 5, wherein the EVOH compatibilizer is present in a 1:1 ratio with the EVOH film barrier.

7. The packaging container of claim 5, wherein the catalyst is a metallocene catalyst.

8. The packaging container of claim 5, wherein the print layer has a thickness of about 0.8 MTh to about 1 MTh.

9. The packaging container of claim 5, wherein the HDPE comprises at least 40 percent by weight of the print layer.

10. The packaging container of claim 5, wherein each layer of the packaging laminate has a haze value of about 10 percent to about 60 percent.

11. The packaging container of claim 5, wherein the packaging container has a percentage of residual oxygen of about 2.65 percent or less over a time period of 52 weeks.

12. The packaging container of claim 5, wherein the sealant layer further comprises a HDPE resin or a LDPE resin.

13. The packaging container of claim 5, wherein the sealant layer further comprises or about 8 percent to about 20 percent weight of an ionomer.

14. A packaging container, comprising:

a container body formed of a packaging laminate, wherein the packaging laminate comprises:

an outer layer comprising a high density polyethylene (HDPE) resin, wherein the outer layer comprises a first side and a second side, and wherein the second side comprises reverse printing;

an intermediate layer adjacent the second side of the outer layer comprising a HDPE resin, a linear low density polyethylene (LLDPE) resin, a low density polyethylene (LDPE) resin, or combinations thereof; and a sealant layer, constituting an inner layer of the packaging laminate, comprising a LLDPE resin with a compatibilizer, ethyl vinyl alcohol (EVOH), and a catalyst present in an amount of about 5 to 33 percent by weight of the sealant layer, wherein the compatibilizer and EVOH are present in a 1:1 ratio, and a degassing valve removably attached to the container body, wherein the degassing valve comprises HDPE, wherein the outer layer has a thickness of about 0.8 MTh to about 1.25 MTh, the sealant layer has a thickness of about 2 MTh to about 3.5 MTh, and the intermediate layer has a thickness of about 1 MTh to about 3 MTh.

15. The packaging container of claim 14, wherein the packaging container is recyclable to the same extent as #2 HDPE film.

16. The packaging container of claim 5, wherein the packaging container is recyclable to the same extent as #2 HDPE film.

17. The packaging container of claim 1, wherein the second layer further comprises an EVOH compatibilizer.

18. The packaging container of claim 17, wherein the EVOH compatibilizer is present in a 1:1 ratio with the EVOH film barrier and comprises between about 2 and 15 percent of the total weight of the second layer.

19. The packaging container of claim 14, wherein the catalyst is a metallocene catalyst.

* * * * *

UNITED STATES PATENT AND TRADEMARK OFFICE
CERTIFICATE OF CORRECTION

PATENT NO. : 11,298,922 B2
APPLICATION NO. : 16/106230
DATED : April 12, 2022
INVENTOR(S) : Lee Phillips Gilbert It is certified that error appears in the above-identified patent and that said Letters Patent is hereby corrected as shown below:

In the Claims

At Column 26, Claim 1, Lines (47-49) should read as follows:
"wherein the first layer has a thickness of about 0.5 MIL to about 1.5 MIL and the second layer has a thickness of about 2 MIL to about 5 MIL".

At Column 27, Claim 5, Lines (14-17) should read as follows:
"MIL to about 2.5 MIL, the sealant layer has a thickness of about 2 MIL to about 4 MIL, and the core layer has a thickness of about 0.4 MIL to about 4 MIL".

At Column 27, Claim 8, Line (24) should read as follows:
"layer has a thickness of about 0.8 MIL to about 1 MIL".

At Column 28, Claim 14, Lines (20-23) should read as follows:
"wherein the outer layer has a thickness of about 0.8 MIL to about 1.25 MIL, the sealant layer has a thickness of about 2 MIL to about 3.5 MIL, and the intermediate layer has a thickness of about 1 MIL to about 3 MIL".

Signed and Sealed this
Eleventh Day of October, 2022

*Katherine Kelly Vidal*
Katherine Kelly Vidal
*Director of the United States Patent and Trademark Office*